United States Patent [19]

Mead

[11] Patent Number: 5,650,816
[45] Date of Patent: Jul. 22, 1997

[54] CORRECTION OF FILM INSTABILITY BASED ON MOVEMENT OF THE VIDEO IMAGE

[75] Inventor: Terence William Mead, Hertford, United Kingdom

[73] Assignee: Rank Cintel Limited, United Kingdom

[21] Appl. No.: 148,398

[22] Filed: Nov. 8, 1993

[30] Foreign Application Priority Data

Nov. 9, 1992 [GB] United Kingdom ............... 9223442

[51] Int. Cl.$^6$ ....................................... H04N 7/18
[52] U.S. Cl. ................................ 348/106; 348/103
[58] Field of Search ............................ 348/103, 106, 348/102, 105, 101, 100, 109, 108, 104, 99, 98, 97, 96

[56] References Cited

U.S. PATENT DOCUMENTS

| | | | |
|---|---|---|---|
| 3,780,222 | 12/1973 | Pickstock et al. | 348/100 |
| 4,897,729 | 1/1990 | Mumford et al. | 348/103 |
| 5,179,314 | 1/1993 | Walker et al. | 348/106 |
| 5,475,423 | 12/1995 | Eiberger | 348/106 |

*Primary Examiner*—Amelia Au
*Assistant Examiner*—Bryan S. Tung
*Attorney, Agent, or Firm*—Ostrolenk, Faber, Gerb & Soffen, LLP

[57] ABSTRACT

Film unsteadiness in a flying spot film scanner (10) is measured by reference to film image movement based on a measure of the direction of movement acquired by examination by a movement compensator 30 of spatial and temporal differences around a given pixel. A correction signal is generated and applied as a feedback signal to the X and Y circuits of the scan generator (20).

24 Claims, 2 Drawing Sheets

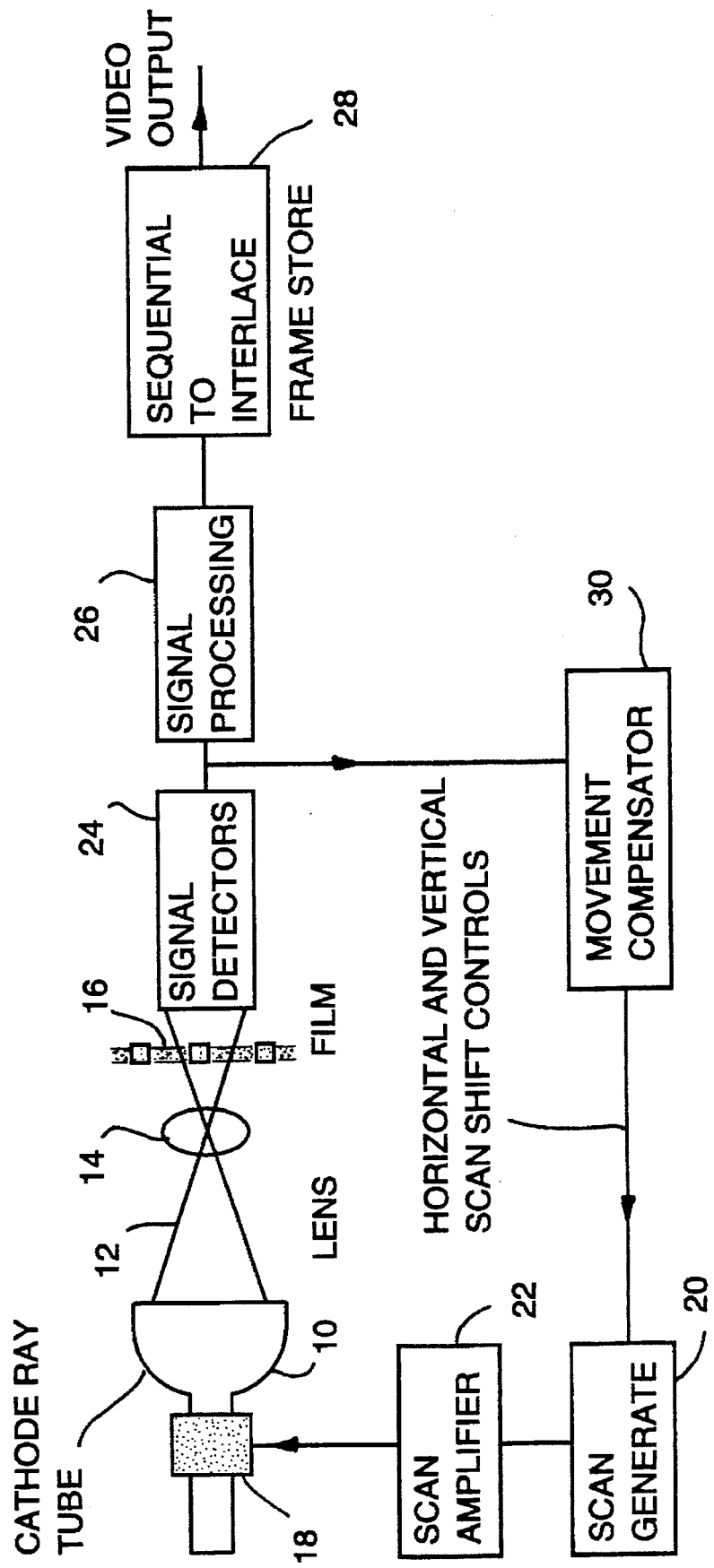

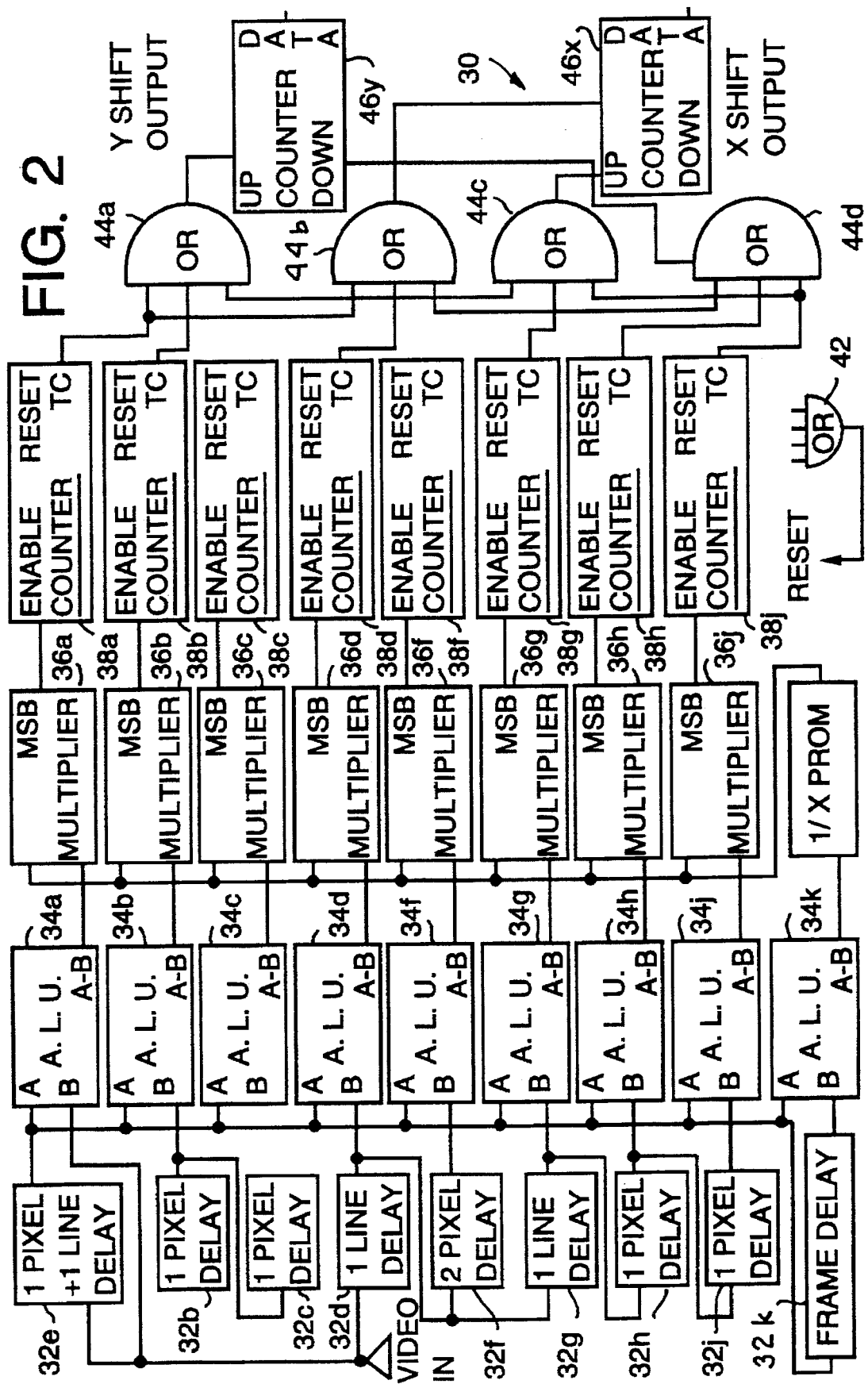

CORRECTION OF FILM INSTABILITY BASED ON MOVEMENT OF THE VIDEO IMAGE

This invention relates to the measurement and correction of film instability which occurs in film scanning equipment which converts between images stored on film and images represented as video signals. The invention is particularly applicable to telecine which converts film images to video signals and may also be applied to cameras.

The problem of film unsteadiness is well known and well documented and there have been many proposals to reduce its effects. Some such proposals apply a correcting signal to the scan shifts. Various means have been suggested for deriving the correcting signal, for example sprocket hole sensing, picture framing bar sensing, sensing of reference marks on film etc.

GB-A-2165417 (British Broadcasting Corporation) proposes the use of motion vectors in film unsteadiness correction. A motion vector measurement derives displacement signals from the input video signal which represent the horizontal and vertical displacement of successive film frames. The output signal is formed by a two-dimensional interpolator under the control of a control circuit in dependence upon the displacement signals. Pans, zooms, shot changes and other global measurements are detected by an exception detector which inhibits the output of the interpolation control to prevent spurious misregistration information.

Various methods for motion estimation have been suggested, for example:

1. Block matching, in which the sum of the absolute values of the differences between the present data and the data from the previous field or frame is computed for a two dimensional block of data. This process is performed with the reference block offset by one or more pixels or lines and the offset which gives the minimum sum is taken to be the motion vector.

2. Phase correlation, which involves a double Fourier Transform and is thought to give more reliable results than 1. above. The two techniques may be combined. An example of phase correlation may be found in a paper by Pearson, J. J., Hines, D. C., Goldman, S. and Kuglin, C. D. entitled 'Video Rate Image Correlation Processor', S.P.I.E. Vol. 119 Application of Digital Image Processing (IOCC 1977). An example of methods 1) and 2) combined is given in WO 87/04033 (British Broadcasting Corporation).

3. Spatio/temporal differences, a simpler system which has generally been discarded due to its inability to deal with large movement.

GB-A-2165417 referred to previously estimates motion by Taylor Expansion, using a truncated Taylor expansion of the frame difference based on a paper by Netravali, A. N. and Robbins, J. D. entitled 'Motion-Compensated Television Coding: Part 1'. B.S.T.J., Vol. 58, No. 3, March 1979. This technique can be considered to be a form of 3. above.

The main advantage of measuring the picture signal rather than sprocket holes or other techniques of film registration is that the measurement is a true indication of the resultant picture unsteadiness. However there are previously mentioned difficulties specific to unsteadiness compensation which arise if the camera or scanner should pan around the image, or if objects within the image are moving. Special techniques must be used to prevent the compensator from attempting to cancel any such movements.

The present invention aims to improve on existing techniques for applying motion vectors to film unsteadiness correction.

In essence; the invention when applied to a flying spot telecine generates a movement signal from the picture signal and applies this to the cathode ray tube scan.

More specifically the invention is defined by the independent claims to which reference should now be made.

Embodiments of the invention have the advantage that more accurate correction of small sub-pixel movements is possible with scan correction than with prior art systems which use the motion signal as a correcting signal to the addressing circuitry of a frame store.

In one embodiment of the invention a prescan of each film frame is performed solely to measure positional errors and is followed by a corrected telecine scan. In another embodiment a system using continuous correction during the film is used, compensating for film motion faster than frame rate. Both alternatives have the advantage of avoiding a one frame delay in telecine scan shift correction which would occur if compensation were derived from one scanned frame and applied to the next.

In one preferred embodiment measurement of motion detects only the direction of motion. Correction feedback is then relied on to reduce the amplitude of the error to zero. Preferably a limited range of correction is imposed to reduce the effect of false corrections caused by global variations such as camera pan etc. Preferably, only the most frequently occuring corrections are used reducing the effect of false corrections due to moving objects within the picture.

Embodiments of the invention will now be described, by way of example and with reference to the accompanying drawings, in which:

FIG. 1 is a simple block diagram of a flying spot telecine having an unsteadiness compensation system operating on the scan generation control; and FIG. 2 is a schematic block diagram of a movement compensator embodying the invention and suitable for use with the embodiments of FIGS. 1 and 2.

The description is given in relation to a flying spot telecine such as the Ursa (RTM) telecine manufactured and sold by Rank Cintel Limited of Ware, Hertfordshire, England. However, it should be noted that the invention is also applicable to other flying spot telecine and other types of telecine such as camera tube telecine, line array and area array telecine and cameras.

The operation of flying spot telecine is well understood and will not be described further except where necessary to understand the present invention. In the embodiment of FIG. 1, a cathode ray tube (CRT) scanner 10 produces a raster scan 12 which is focussed by lens 14 onto cinematographic film 16. The scan is produced by vertical and horizontal deflection coils 18 under the control of digital scan generator 20 whose output is amplified by scan amplifier 22 prior to application to the deflection coils. Although the scan is usually a sequential raster scan, the position of the scan on the CRT faceplate and the nature of the scan may be varied by suitable control of the scan generator 20.

Light transmitted through the film on scanning is detected by signal detectors 24. These detectors are conventionally separate red, green and blue photo-multiplier tubes. In the Ursa telecine, the analog R, G, B video signals are converted into digital signals and then processed separately by signal processor 26 before conversion into an interlaced signal in frame store 28.

The signal is output in any desired form, such as digital 4:2:2, Y Cr or RGB for recording or transmission. The signal processing stage 26 applies a number of corrections to the signal, such as aperture correction, afterglow correction, primary and secondary colour correction.

In the embodiment of FIG. 1, the R, G, B signal is split after analog-to-digital conversion of the photo-multiplier output of the signal detectors 24. One signal path processes the signal in the normal manner described whereas the other path forms the input to movement compensator 30, the output of which provides horizontal and vertical scan shift controls for the scan generator 20.

The use of any known motion vector measurement may be employed with the system of FIG. 1 to detect the degree and direction of motion of images represented by a video signal. This measure of movement is then applied as a correction signal to the scan circuitry of the flying spot film scanner. This technique allows more accurate correction of small sub-pixel movements than a system which uses the detected movement as a correction signal for the addressing of a frame store to compensate for that motion. This latter type of system is employed in GB-A-2165417 discussed previously.

The method of correction described would always result in the scan shift being applied one frame too late. This may be avoided by introducing a prescan which scans the film image only to measure the positional errors and is immediately followed by the normal, but corrected, telecine scan. As an alternative, a system using continuous correction during the frame could be used, compensating for film motion at a rate higher than the frame rate.

The method described could be simplified by only detecting the direction of motion, and not its degree, and relying on the correction feedback to reduce the amplitude of the error to zero. A limited range of correction is necessary to reduce the effect of false corrections prompted by global changes in the picture caused, by example, by panning or scene shifting. Using only the most frequently occuring correlations reduces the effect of false corrections due to moving objects within the picture.

It would be possible to estimate movement during one film frame and to apply a constant correction to the whole of the next frame. This may be satisfactory for certain types of camera or telecine in which the whole of the picture frame is captured simultanously. Continuous motion telecines, however, can suffer from picture movement during a frame. It is therefore preferable to measure and correct over a shorter period, for example on a line by line basis.

In the embodiment of FIG. 1, using the simplified method described above, the movement compensator 30 measures the direction only of the picture movement since the previous frame. The horizontal (X) and vertical (Y) correction signals are increased or decreased to move the scans in the same direction as the film. This process of measurement and correction is continued during the frame until the relative movement of the film and scans is zero. Subsequently, the movement of the film is tracked by the scans to provide a stable picture image.

The algorithm chosen to measure the picture movement is as follows.

It can be demonstrated that the logical function:

$$\left[ IF \frac{P_o - P_n}{P_o - L_o} > 1.0 \right]$$

where $P_o$ = 'present time' pixel data $P_n$ = pixel data from one of 8 (n) spatially surrounding pixels $P_1, P_2, P_3$
$P_4, P_o, P_5$
$P_6, P_7, P_8$ $L_o$ = pixel data from present location in previous frame produces a 'true' value for every pixel where the picture has moved by up to one pixel in the direction represented by 'n', whilst for other directions 'n' there will be some false values produced. A reliable estimate of the direction of picture motion can therefore be obtained by finding the value of 'n' with the most frequent true values.

It is also found that the value of $$\frac{\Sigma ABS(P_o - L_o)}{\Sigma ABS(P_o - P_n)}$$

for the chosen direction 'n' represents that fraction of a line or pixel through which the picture has moved, although this relationship is not used in this embodiment.

The above algorithms are not favoured for motion vector measurement since they become unreliable for movement exceeding one pixel or line.

However in this application the movement measured is constantly being fed back to make the scans track the film so that the measurement does not exceed that level.

Referring now to FIG. 2, the movement compensator circuit operates as follows:

The video input signal to the movement compensation circuit is fed to a series of delays 32a–j each arranged to provide eight signals which spatially surround a 'present time' pixel. Each of these signals is subtracted from the present time signal delayed through 1 line and one pixel delay 32e by an arithmetic logic unit 34a–j. The relative delays may be appreciated by considering a block of 9 pixels a–j as follows:

| a | b | c |
| d | e | f |
| g | h | j |

Where e is the 'present' time pixel. The relative positioning of the pixels is therefore

| 0  | 1p      | 2p      |
| 1L | 1L + 1p | 1L + 2p |
| 2L | 2L + 1p | 2L + 2p |

In FIG. 2, an additional alu. 34k is provided which subtracts the present time pixel from its counterpart in the previous frame which is provided by delaying the present time delay 32(e) of 1 line +1 pixel by a further 1 frame delay in delay element 32k.

The output of the arithmetic unit 34k, which represents the inter-frame difference for the centre pixel, is fed to a programmable read only memory device PROM 40 which outputs the reciprocal of the input from its look-up table. The outputs of the other alus 34a–j, which represent the difference between the present time pixel and each of the neighbouring pixels are fed each to a respective multiplier 36a–j in which the (a–b) input from the alu 34 is multiplied by the reciprocal output from PROM 40. This operation effectively divides the spatial difference signals by the temporal difference. The scaling of the signals to the multipliers 36 is chosen such that the output m.s.b. is only true when the output signal exceeds 1.0.

Thus, the circuit up to the output of the multipliers performs the equation $$\left[ \text{IF} \frac{P_o - P_n}{P_o - L_o} > 1.0 \right]$$

The number of pixels giving a true (1.0) result is counted for each of the eight spatial offsets using counters 38a–j and the first one to reach a maximum count gives the appropriate output pulse, corresponding to the spatial frequency offset with the most frequent true results, and resets all counters by outputting a logical high to eight input OR gate 42 whose output is coupled to the reset pins of each counter 38.

The counter output pulse is then decoded by the OR gates 44a–d to increment or decrement the appropriate combination of the output X shift and output Y shift up-down counters 46 X, Y the output signal of which is fed to the scan generation circuitry 20 of FIG. 1.

From the preceding description it will be appreciated that counters 38a–c correspond to the top left, top middle and top right pixels surrounding the present time pixel; counters 38d, f to the middle left and middle right; and counters 38g–j to the bottom left, bottom middle and bottom right, respectively. Thus it will be seen that a true output from any of the three top row counters will increment the Y shift counter 46Y upwards whereas a true output from any of the bottom row counters will increment the Y shift count downwards. A true count from any of the left hand row a, d, g counters will increment the X counter 46X up and a true output from the left hand row c, f, j will increment X counter 46X downwards.

The outputs from these up-down counters 46X, Y are added to the scan shifts generated by the scan generator 20 in such a direction as to compensate for the film unsteadiness. If, for example, the film moves slightly to the left then the fourth counter from the top will be enabled and after 16 clocks (assuming a 4 bit counter) will give an up count pulse to the X shift counter causing the scans to move very slightly in the same direction as the film and to reduce the next measurement. The circuit is therefore desirably unable to follow faster movements (greater than about 1 pixel per frame perhaps) such as might be due to picture object movement or camera pans, and would not react quick enough to cause local geometric picture distortions. In practice the amount of movement due to one output counter step is arranged to be imperceptible to the eye and yet is more than the film would move between measurement results (i.e. in a 16 clock interval). In the situation where the film is not perceptibly moving then the counters would be getting random enables and would take longer to reach maximum count, the one which happens to give an output pulse causes the scans to move which would ensure that the next output pulse is in the opposite direction, and maintain an average steady scan position, the pulse to pulse movement being too small to detect. Furthermore the range of the output correction signals is limited to a small amount equivalent to the maximum expected film movement (perhaps ±4 pixels), thereby ensuring that the scans are not shifted significantly due to prolonged picture movement such as a camera pan.

In the example quoted the 8 counters 38a–j are assumed to be 4 bit counters having a total count of 16. The total count can be chosen to optimise the performance. Another example would be to have a total count of say 1024 (10 bit counters) which is similar to the number of samples in a video line. In this case the output pulse would correspond to the spatial offset with the most frequent true values over about one line of the scan. This will help to avoid false corrections from moving objects within the picture because they will generally be of less than a half line in width. The total count does not need to be an exact power of 2 nor does it need to be related to the numbers of pixels in a line.

One problem which can arise from the embodiments described is the effect of the picture edge or blanking information. This may be overcome by producing an extended blanking or masking signal which can be applied to inhibit the counters when the scan is near or beyond the edge of the picture.

Although described with respect to flying spot telecine, the invention may be applied to other types of telecine such as camera tube telecine or CCD telecine. A camera tube embodiment would operate in a manner similar to that illustrated in FIG. 1. However, the cathode ray tube is replaced with a light source and the photomultiplier tubes (signal detectors 24 in FIG. 1) replaced by camera tubes or by a single camera tube in the case of a single tube monochrome camera. The frame store is discarded. The scan amplifier then feeds the camera tubes rather than the CRT.

In the case of line array CCD telecine the cathode ray tube is replaced by a light source and the photomultiplier tubes by line array CCD sensors. The scan generators and amplifiers are replaced by timing circuits feeding the CCD sensors.

The CCD example operates in a slightly different manner. Rather than moving the scan position, the movement compensator adjusts for vertical picture displacement by advancing or delaying the time at which each line scan of the CCD sensor is initiated. By delaying the start of the scan the film image will have moved further due to its constant motion. One disadvantage of this method is that timing changes will cause fluctuations of picture brightness due to variations in the time for which light is applied to the sensor. This problem can be overcome by measuring the application time for each line and dividing the video signal by this value. Horizontal picture displacement may be similarly compensated by adjusting the relative timing between the CCD sensor scan initiation and the A to D conversion and video store writing pulses.

Pre-scanning a frame of film as described previously would only work if two sets of line array sensors were used. The spacing of these would have to be determined accurately and problems would arise with variable film speed operation. A solution to these problems would be to prescan each line rather than each frame.

I claim:

1. A method of correcting for image unsteadiness in an image formed from a conversion between images recorded on a cinematographic film and images represented by video signals wherein a scanning means produces a scan which scans said cinematographic film to produce a scan signal, said scan signal being processed by processing means to form a video image signal, said video image signal representing said video image; the method comprising the steps of:

deriving a measurement of said image unsteadiness based on movement of the video image represented by said video image signal;

converting the said image unsteadiness measurement to a correction signal;

applying the said correction signal to a scan control means associated with the said scanning means; and shifting the position of the said scan with respect to the said film in accordance with the said measured image unsteadiness.

2. A method according to claim 1, wherein the said measurement of image unsteadiness is wholly based on the direction of the said movement of the said video image as represented by the said video image signal.

3. A method according to claim 1, further comprising the steps of:
defining a limited range of image unsteadiness measurements for which the said correction signal is applied to the said scan control means;
comparing the said image unsteadiness measurement to the said limited range; and
applying the said correction signal to the said scanned control means when the said image unsteadiness measurement falls within the said limited range.

4. A method for correcting for image unsteadiness in an image formed from a conversion between images recorded on a plurality of frames of a cinematographic film and images represented by video signals, wherein a scanning means produces a scan which scans the said cinematographic film to produce a scan signal, said scan signal being processed by processing means to form a video image signal, said video image signal representing said video image; the method comprising the steps of:
pre-scanning each of the said film frames or portions thereof during a first scan to produce a first video image signal;
deriving a measurement of said image unsteadiness based on movement of a first video image as represented by the said first video image signal;
converting the said image unsteadiness measurement to a correction signal;
applying the said correction signal to a scan control means associated with the said scanning means;
shifting the position of the said scan with respect to the said film in accordance with the said measured image unsteadiness;
scanning the said film frames or portions thereof during a second scan for the said conversion.

5. A method according to claim 4, wherein the said measurement of image unsteadiness is wholly based on the direction of the said movement of the said first video image as represented by the said first video image signal.

6. A method according to claim 4, further comprising the steps of:
defining a limited range of image unsteadiness measurements for which the said correction signal is applied to the said scan control means;
comparing the said image unsteadiness measurement to the said limited range;
applying the said correction signal to the said scan control means when the said image unsteadiness measurement falls within the said limited range.

7. A method for correcting for image unsteadiness in an image formed from a conversion between images recorded on a plurality of frames of a cinematographic film, which in use is wound at a preset film frame rate, and images represented by video signals wherein a scanning means produces a scan which scans the said cinematographic film to produce a scan signal, said scan signal being processed by processing means to form a video image signal, said video image signal representing said video image; the method comprising the steps of:
deriving a measurement of said image unsteadiness based on movement of the video image represented by the said video image signal wherein the said measurement is derived at a rate greater than the said film frame rate;
converting the said image unsteadiness measurement to a correction signal;
continuously applying the said correction signal to a scan control means associated with the said scanning means during the scanning of a given frame for the said conversion; and
shifting the position of the said scan with respect to the film in accordance with the said measured image unsteadiness.

8. A method according to claim 7 wherein the said measurement of image unsteadiness is wholly based on the direction of the said movement of the said video image as represented by the said video image signal.

9. A method according to claim 7, further comprising the steps of:
defining a limited range of image unsteadiness measurements for which the said correction signal is applied to the said scan control means;
comparing the said image unsteadiness measurement to the said limited range; and
applying the said correction signal to the said scanned control means when the said image unsteadiness measurement falls within the said limited range.

10. A method according to any of claims 1, 4 or 7 wherein the scanning means is a flying spot scanner having a flying spot scan pattern generator and the said correction signal is applied to the said flying spot scan pattern generator.

11. A method according to any of claims 1, 4 or 7 wherein the scanning means comprises at least one scanning camera tube having a scan generator and the said correction signal is applied to the said scan generator.

12. A method according to any of claims 1, 4 or 7 wherein the scanning means comprises a CCD line array with sensors fed by timing circuits and the said correction signal is applied to the said timing circuits.

13. An apparatus for correcting image unsteadiness in an image formed from a conversion between images recorded on a cinematographic film and images represented by video signals wherein a scanning means produces a scan which scans the said cinematographic film to produce a scan signal, said scan signal being processed by a processing means to form a video image signal, said video image signal representing said video image; comprising:
deriving means for deriving a measurement of said image unsteadiness based on movement of the video image represented by the said video image signal;
conversion means for converting the said image unsteadiness measurement to a correction signal;
correction means for applying the said correction signal to a scan control means associated with the said scanning means, wherein said scan control means shifts the position of the said scan with respect to the film in accordance with the said measured image unsteadiness.

14. Apparatus according to claim 13, wherein the said deriving means derives said image unsteadiness measurement wholly from the direction of the movement of the said image represented by the said video image signal.

15. Apparatus according to claim 13, further comprising:
defining means for defining a limited range of image unsteadiness measurements for which the said correction signal is applied to the said scan control means;
comparison means for comparing the said image unsteadiness measurement to the said limited range and wherein the said correction means only applies said correction signal to the said scan control means if the said image unsteadiness measurement falls within the said limited range.

16. Apparatus according to claim 13, wherein the said deriving means comprises logic means for determining whether $$\left[\frac{P_o - P_n}{P_o - L_o}\right] > 1.0$$

where $P_o$ is a present time pixel data;

$P_n$ is pixel data from n pixels surrounding $P_o$;

and $L_o$ is pixel data from the location of pixel $P_o$ in the previous frame.

17. Apparatus according to claim 16, wherein the said scan control means comprises generator means for generating horizontal and vertical scans, said generator including a horizontal scan address and a vertical scan address and wherein the said correction means comprises a logic operation output measuring means for measuring when the output of the said logic means produces a true value for a plurality of pixels $P_n$ and shifting means for shifting the horizontal and/or vertical scans produced by the said scanning means.

18. Apparatus according to claim 16 wherein the said logic means comprises a plurality of delay means for producing a plurality of values of $P_n$ and a frame delay means for producing a value for $L_o$, first subtraction means for forming the difference $(P_o - P_n)$ for each of the said n pixels, second subtraction means for forming the difference $(P_o - L_o)$ and multiplication means for multiplying the reciprocal of the said difference $(P_o - L_o)$ with the said difference $(P_o - P_n)$ for each value of n.

19. Apparatus according to claim 17, wherein the said logic operation output measuring means comprises n counters and the said shifting means comprises a first up-down counter means for the said horizontal scan address and a second up-down counter means for the vertical scan address.

20. Apparatus according to claim 19, wherein each of the said n counters of the said logic operation output measuring means is a four bit counter.

21. Apparatus according to claim 19, wherein each of the said n counters of the said logic operation output measuring means is a ten bit counter.

22. Apparatus according to claim 13, wherein the scanning means is a flying spot scanner generating a flying spot and wherein the said scan control means comprises a scan pattern generator for generating a scan pattern for the said flying spot.

23. Apparatus according to claim 13, wherein the scanning means comprises at least one scanning camera tube and the scan control means comprises scan pattern generating means for generating a scan pattern for the camera tube.

24. Apparatus according to claim 13, wherein the scanning means is a CCD line array scanner and wherein the scan control means comprises timing means for adjusting the timing of initiation of the scans by the CCD line array.

* * * * *